UNITED STATES PATENT OFFICE 2,657,206

2,4-DIAMINO-5-ARYLOXY-PYRIMIDINES

George H. Hitchings, Tuckahoe, Peter Byrom Russell, Crestwood, and Elvira A. Falco, New Rochelle, N. Y., assignors to Burroughs Wellcome & Co. (U. S. A.) Inc., Tuckahoe, N. Y., a corporation of New York No Drawing. Application July 30, 1951,
Serial No. 239,414

6 Claims. (Cl. 260—256.4)

The present invention relates to new pyrimidine derivatives and is based on the discovery that certain pyrimidine derivatives containing aryloxy substituents at the 5 position of the pyrimidine ring have valuable antibacterial properties. The discovered activity of these derivatives has opened the way to a new group of pyrimidine compounds apparently discouraging bacterial growth by acting as antagonists of pteroylglutamic (folic) acid and purines which are known growth producing factors for many microorganisms. This application is a continuation-in-part of our application Serial No. 74,462, filed February 3, 1949.

Based on reversal experiments we believe that at least in part these compositions act by antagonizing the utilization of pteroylglutamic acid by microorganisms. This assumption is based largely on the fact that under certain conditions the action of the antibacterial agent can be entirely reversed by the addition of an excess of pteroylglutamic acid to the nutrient medium. This theory does not entirely explain the action of the new derivatives since when the concentration of the inhibitor is greater than an established critical concentration the antibacterial action is no longer reversed by the addition of pteroylglutamic acid, purines or combinations of these growth producing factors.

We do not consider the theory of action of the new derivatives described herein in checking bacterial growth to be essential to our invention but it is set forth here to illustrate the broad conception of our invention and the scientific teachings pertinent thereto.

The antibacterial potency of the new compounds may be tested in connection with the growth of certain non-pathogenic microorganisms such as *Lactobacillus casei* in such a way that antagonistic effects of the compounds toward purines and the pteroylglutamic acid can be assayed. When tested in such a manner certain of the newly discovered compounds displayed extraordinary activity on inhibiting the growth of *Lactobacillus casei* and in one case as little as 0.01 microgram of the drug per milliliter was sufficient to completely prevent the growth of the microorganism. The new compounds also displayed similar action against certain pathogenic bacteria including pneumococcus, streptococcus and staphylococcus organisms.

We have found according to the present invention that the unusual antibacterial activity described above is exhibited by the 2,4-diamino-pyrimidine compounds containing an aryloxy grouping at the 5 position of the pyrimidine ring.

Preferably the compositions contemplated by the present invention may be represented as substituted pyrimidines of the formula

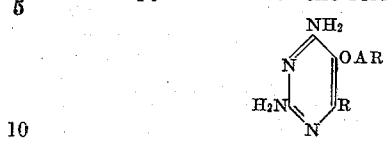

wherein R constitutes a radical selected from the group consisting of H and lower alkyl radicals and Ar constitutes an aryl radical having from six to thirteen carbon atoms and contains a maximum of two rings.

The compounds containing a 5-aryloxy grouping according to the invention display an appreciably greater potency than pyrimidine derivatives substituted in the 5 position with alkyl, aryl, alkyloxy or similar groupings. Moreover, the 5-aryloxy diamino derivatives are considerably more potent and differ qualitatively from similar derivatives containing substituted amino groups at the 2 and 4 positions of the ring. The substituted amino compounds differ from the unsubstituted variety in the respect that they do not have the same tendency toward reversal by specific nutrilites such as pteroylglutamic acid and purines and in general are much less active in our tests.

The process of the present invention may involve the initial preparation of an alpha aryloxy acetate which is treated with an alkyl formate in the presence of metallic sodium or sodium ethoxide to produce an alpha-aryloxy-beta-carbonyl-carboxylic ester. When 6-substituted pyrimidine compounds are desired beta-keto esters may be converted to alpha-chloro-beta-keto esters by known methods and reacted with the selected sodium phenolates or naphtholates to form the corresponding alpha-aryloxy-beta-keto esters.

The new compositions may be conveniently prepared by the reaction of a selected alpha-aryloxy-beta-carbonl-carboxylic ester or keto derivative with urea or a compound containing a functional derivative of urea such as thiourea, alkylisothiourea or guanidine to produce the corresponding 5-aryloxy-pyrimidine derivatives. The formation of the pyrimidine ring compound by this reaction may be represented in the following manner:

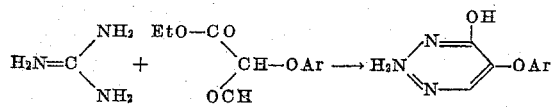

By an alternative though less convenient method a 2-amino-4,6-dihydroxy-5-aryloxy-pyrimidine may be formed by reacting a suitable aryloxmalonic ester with guanidine and chlorinating the product to replace the two hydroxy groups followed by treatment with ammonia to form the 2,4-diamino-5-aryloxy-6-chloropyrimidine from which the 6-chloro group is eliminated by reduction.

Where compositions containing substituents at the 6-position are desired a suitable alpha-aryloxy-beta-keto ester is reacted with a reagent containing the functional urea group as shown by the formula:

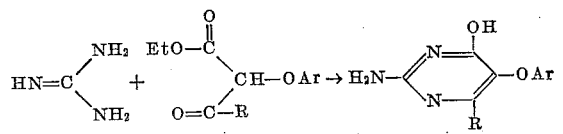

Since according to the present invention the active compounds contain unsubstituted amino groups at the 2 and 4 positions, guanidine is a preferred reagent as it results in the formation of an amino group in the 2 position. The resulting 2-amino-4-hydroxy-5-aryloxy pyrimidine may then be chlorinated and the 2-amino-4-chloro-5-aryloxy pyrimidine treated with ammonia to give the desired diamino derivative. Alternatively, the condensation product with guanidine may be treated by the method of Hitchings and Elion as set forth in U. S. Patent No. 2,451,793 to form the 2-amino-4-thiol pyrimidine and this product in turn treated with ammonia to yield the diamino derivative.

The following examples may serve to illustrate the methods used in preparing the compounds according to the present invention but are not intended in any way to limit the invention, the scope of which is defined in the claims.

EXAMPLE 1

*2,4-diamino-5-p-chlorophenoxypyrimidine*

A mixture of 95 g. (0.46 mole) of ethyl-p-chlorophenoxy acetate and 37 g. (0.50 mole) of ethylformate is added slowly to 500 milliliters of dry diethyl ether containing 10.6 g. (0.46 mole) of sodium wire and the resulting mixture allowed to stand overnight at about room temperature. An alcoholic solution of guanidine (prepared by mixing 35 g. of guanidine hydrochloride and an alcoholic solution of sodium ethylate) is added to the solution and the ether removed by evaporation. The reaction mixture is then heated under a reflux condenser for four hours and the 2-amino-4-hydroxy-5-p-chlorophenoxypyrimidine precipitated by adding 3 liters of cold water and then acidifying to a pH of about 6.5. The product is purified by recrystallization from glacial acetic acid. A portion of the product (15 g.) is dissolved in 50 milliliters of phosphoryl chloride and refluxed for about half an hour. The excess phosphoryl chloride is distilled from the product and the reaction mixture chilled in the presence of cracked ice and neutralized to precipitate the 2-amino-4-chloro-5-p-chlorophenoxypyrimidine which is washed with water and dried under vacuum.

The amination of the product is performed by treating 3 g. of the 2-amino-4-chloro-5-p-chlorophenoxypyrimidine with 100 milliliters of a saturated ethanolic ammonia solution in a sealed vessel at a temperature of about 150° C. for a period of sixteen hours. The product is evaporated to dryness on a steam bath and taken up in 50 milliliters of water whereupon the desired diamino derivative is precipitated by the addition of excess saturated sodium hydroxide solution. Purification is performed in aqueous medium by the addition of hydrochloric acid followed by precipitation with sodium hydroxide solution, the pure compound recovered having an M. P. of 173–175° C.

EXAMPLE 2

*2,4-diamino-5-m-chlorophenoxypyrimidine*

This compound when prepared by the same procedure of Example 1 was obtained in good yield having an M. P. of 180.5–181.5° C.

EXAMPLE 3

*2,4-diamino-5-o-chlorophenoxypyrimidine*

This compound when prepared by the procedure of Example 1 was recovered in substantial yield having an M. P. of 142–145° C.

EXAMPLE 4

*2,4-diamino-5-(2',4'-dichlorophenoxy)-pyrimidine*

This compound when prepared by a procedure similar to that followed in Example 1 and the M. P. of the recovered product established at 160–162° C.

EXAMPLE 5

*2,4-diamino-5-beta-naphthoxypyrimidine*

To 4.7 g. of sodium wire in 250 ml. of dry ether was added a solution of 47 g. of ethyl-beta-naphthoxyacetate and 15 g. of ethylformate. The mixture was allowed to stand 2 days at room temperature. The sodio-ethyl-formyl-meta-naphthoxy acetate formed in the above reaction was treated with a solution of guanidine in ethanol (from a solution of 19.5 g. of guanidine hydrochloride in ethanol and sodium ethylate from 4.7 g. of sodium in 300 ml. of ethanol). The solution was warmed to evaporate the ether and then heated under a reflux condenser for 20 hours, then cooled, poured into water and acidified with acetic acid. The 2-amino-4-hydroxypyrimidine (11 g.) was refluxed with 50 ml. of phosphoryl chloride for an hour until solution was complete. After removal of the excess phosphorous oxychloride the melt was poured on to ice, made alkaline with ammonia and the 2-amino-4-chloropyrimidine was recovered by filtration. The chloro compound was heated with a saturated alcoholic ammonia solution at 130° for 16 hours in a sealed system. The mixture was evaporated to dryness and the residue was extracted with 5 N sodium hydroxide solution and filtered. The 2,4-diamino-5-beta-naphthoxypyrimidine when purified by solution in dilute acetic acid and precipitation by the addition of sodium hydroxide, had an M. P. of 204–206° C.

EXAMPLE 6

*2,4-diamino-5-(p-benzylphenoxy) pyrimidine*

The above compound when prepared by the method of Example 5 had an M. P. of 186–187° C.

EXAMPLE 7

*2,4-diamino-5-(p-phenylphenoxy) pyrimidine*

The above compound when prepared by the method of Example 5 had an M. P. of 246–249° C.

EXAMPLE 8

*2,4-diamino-5-p-chlorophenoxy-6-methylpyrimidine*

To a solution of ethyl-alpha-chloroacetoacetate in alcohol is added an equimolar quantity of sodium p-chlorophenolate and the mixture was heated under a reflux condenser for two days. The mixture was poured into water and the ethyl-p-chlorophenoxyacetoacetate was recovered by extraction with benzene and ether, and after drying was purified by distillation. The resulting ester was condensed with an equimolecular quantity of guanidine carbonate in alcoholic solution on the steam bath and the 2-amino-4-hydroxypyrimidine was recovered from dilute aqueous acetic acid. The 2-amino-4-chloro derivative was prepared and aminated as in the previously given examples. The final product melted at 205–207° C.

EXAMPLE 9

*2,4-diamino-5-p-chlorophenoxypyrimidine*

10 g. of 2-amino-4-hydroxy-5-p-chlorophenoxypyrimidine, prepared as in Example 8, was heated at 155–162° C. with stirring for 2 hours with 30 g. of phosphorous pentasulfide in 100 ml. of tetrahydronaphthalene. The mixture was cooled, the solvent was decanted, and the viscous residue was washed with ether. The residue was dissolved in dilute ammonium hydroxide, treated with carbon, filtered, and the filtrate acidified with acetic acid. The 2-amino-4-thiol-5-p-chlorophenoxypyrimidine was recovered as a yellow crystalline substance. The aminothiolpyrimidine was treated with concentrated aqueous ammonium hydroxide at 155° C. for 48 hours. The 2,4-diamino-5-p-chlorophenoxypyrimidine recovered was identical with that prepared by the process of Example 8.

EXAMPLE 10

*2,4-diamino-5-(p-carbethoxyphenoxy)-pyrimidine*

By the method of Example 1, ethyl-p-carbethoxyphenoxyacetate was formylated and condensed with guanidine giving 2-amino-4-hydroxy-5-(p-carbethoxyphenoxy) pyrimidine. This was then treated with phosphoryl chloride and the product of that treatment was aminated also by the method of Example 1. During the precipitation of the product from aqueous solution by addition of sodium hydroxide solution, one compound first precipitated and was identified as 2,4-diamino-5-(p-carbethoxyphenoxy) pyrimidine. After sublimation it melted at 175–9°.

EXAMPLE 11

*2,4-diamino-5-(p-carboxyphenoxy)-pyrimidine*

Further addition of sodium hydroxide solution to the mother liquors from the precipitation of the carbethoxy compound gave another precipitate, probably a sodium salt, from which was obtained 2,4-diamino-5-(p-carboxyphenoxy)-pyrimidine which melts with decomposition over 260°.

The following compounds are prepared by methods similar to those set forth above and indicated in the preceding descriptions:

12. 2,4-diamino-5-phenoxypyrimidine
13. 2,4-diamino-5-(2',4'-dibromophenoxy) pyrimidine
14. 2,4-diamino-5-(p-benzyloxyphenoxy) pyrimidine
15. 2,4-diamino-5-α-naphthoxypyrimidine
16. 2,4-diamino-5-(6'-dibromo-2'-naphthoxy) pyrimidine
17. 2,4-diamino-5-(4'-bromo-1'-naphthoxy) pyrimidine
18. 2,4-diamino-5-(2',4'-dibromo-1'-naphthoxy) pyrimidine
19. 2,4-diamino-5-(4'-chloro-1'-naphthoxy) pyrimidine
20. 2,4-diamino-5-(2',4'-dichloro-1'-naphthoxy) pyrimidine
21. 2,4-diamino-5-(1'-chloro-2'-naphthoxy) pyrimidine
22. 2,4-diamino-5-(1',6'-dichloro-2'-naphthoxy) pyrimidine
23. 2,4-diamino-5-(6'-chloro-2'-naphthoxy) pyrimidine
24. 2,4-diamino-5-(p-hydroxyphenoxy) pyrimidine
25. 2,4-diamino-5-p-methoxyphenoxypyrimidine
26. 2,4-diamino-5-p-ethoxyphenoxypyrimidine
27. 2,4-diamino-5-p-benzyloxyphenoxypyrimidine
28. 2,4-diamino-5-o-methoxyphenoxypyrimidine
29. 2,4-diamino-5-p-methoxyphenoxy-6-methylpyrimidine
30. 2,4-diamino-5-p-ethoxyphenoxy-6-methylpyrimidine
31. 2,4-diamino-5-p-methoxyphenoxy-6-n-propylpyrimidine
32. 2,4-diamino-5-p-ethoxyphenoxy-6-propylpyrimidine
33. 2,4-diamino-5-p-chlorophenoxy-6-propylpyrimidine
34. 2,4-diamino-5-(2',6'-dibromo-β-naphthoxy)-6-propylpyrimidine
35. 2,4-diamino-5-(4'-chloro-α-naphthoxy)-6-propylpyrimidine
36. 2,4-diamino-5-p-phenylphenoxy-6-propylpyrimidine
37. 2,4-diamino-5-p-benzylphenoxy-6-methylpyrimidine
38. 2,4-diamino-5-(4'-chloro-alpha-naphthoxy)-6-methylpyrimidine
39. 2,4-diamino-5-(1',6'-dibromo-β-naphthoxy)-6-methylpyrimidine
40. 2,4-diamino-5-(4'-methoxy-2'-bromophenoxy)-pyrimidine
41. 2,4-diamino-5-(4'-ethoxy-2'-chlorophenoxy)-6-methylpyrimidine

EXAMPLE 42

*Preparation of 2,4-diamino-5-(p-propionylphenoxy)-6-methylpyrimidine*

From 88 g. of sodio-p-hydroxy propiophenone and 80 g. of ethyl-α-chloroaceto acetate in boiling toluene was prepared ethyl-α-acetyl-p-propionylphenoxy acetate. This crude material was condensed with guanidine (from 11.2 g. sodium and 48 g. guanidine hydrochloride) to give 29.0 g. of crude 2-amino-4-hydroxy-5-(p-propionylphenyl)-6-methylpyrimidine. This compound (15 g.) after the usual treatment with phosphoryl chloride followed by heating with alcoholic ammonia at 160° gave 8.1 g. of 2,4-diamino-5-p-propionylphenoxy-6-methyl pyrimidine, M. P. 216–217° after recrystallization from ethanol.

EXAMPLE 43

*2,4-diamino-5-(2'phenyl-4'-chlorophenoxy)-pyrimidine*

From ethyl 2-phenyl-4-chlorophenoxy acetate, sodium wire and ethyl formate followed by treatment with guanidine was prepared the crude 2-amino-4-hydroxy compound. This compound after usual treatment with phosphorous oxychloride followed by ammonia gave 2,4-diamino-5-(2'phenyl-4'-chlorophenoxy) pyrimidine, M. P. 208–211°.

EXAMPLE 44

*2,4-diamino-5-(3'-methyl-4'-chlorophenoxy) pyrimidine*

From ethyl 3-methyl-4-chlorophenoxy acetate (80 g.) ethyl formate (28 g.) and 8.0 g. sodium wire in ether was prepared crude ethyl-α-formyl-3-methyl-4-chlorophenoxy-acetate. This was condensed with guanidine in the usual manner to give (90 g.) crude aminohydroxy compound. Seventeen grams of this compound when treated in the usual manner with phosphoryl chloride followed by ammonia gave 5.0 g. of the 2,4-diamino-5-(3'-methyl-4'-chlorophenoxy)-pyrimidine, melting at 173–175°.

EXAMPLE 45

*2,4-diamino-5-(p-methylphenoxy)-pyrimidine*

From 48.5 g. ethyl-p-methyl-phenoxyacetate, 18.5 g. ethyl formate and 5.2 g. of sodium in dry ether was prepared crude ethyl α-formyl-p-methylphenoxyacetate which when condensed with guanidine under the usual conditions gave 45 g. of the crude amino-hydroxy compound. Fifteen grams of crude compound was treated with phosphoryl chloride followed by treatment of the chloro derivative with ammonia under the usual conditions to give 5 g. of 2,4-diamino-5-(p-methylphenoxy)-pyrimidine. The hydrochloride of this compound melts at 272–273°.

EXAMPLE 46

*2,4-diamino-5-(3'4'-dimethylphenoxy)-6-methylpyrimidine*

From 22 g. of 4-hydroxy-1,2-dimethylbenzene and 30 g. of ethyl α-chloroacetoacetate with 4.0 g. of sodium in toluene was prepared crude ethyl-α-acetyl-3,4-dimethylphenoxy acetate. This compound when condensed with guanidine carbonate in ethanol gave 20 g. of the crude 2-amino-4-hydroxy pyrimidine. This compound (15 g) when treated as above gave 6.8 g. of the 2,4-diamino-5-(3'4'-dimethylphenoxy)-6-methylpyrimidine melting at 220–223°.

EXAMPLE 47

*2,4-diamino-5-(2'6'-dimethoxyphenoxy) pyrimidine*

From 29 g. of ethyl 2,6-dimethoxy-phenoxyacetate, 10 g. of ethyl formate and 2.9 g. sodium wire in ether was prepared ethyl-α-formyl-2,6-dimethoxy phenoxy acetate which, when condensed with guanidine gave 22.0 g. of the 2-amino-4-hydroxy pyrimidine. From 15 g. of the above compound treated in the usual manner, was obtained 5.7 g. of 2,4-diamino-5-(2'6'-dimethoxyphenoxypyrimidine melting at 200–203° after recrystallization from ethanol.

EXAMPLE 48

*2,4-diamino-5-(p-benzenesulfonylphenoxy)-6-methyl pyrimidine*

From 60 g. of sodio p-hydroxydiphenyl sulfone and ethyl α-chloroacetoacetate in toluene was prepared crude ethyl α-acetyl-p-phenylsulfonyl phenoxyacetate. This when condensed with guanidine in the usual manner gave 8.5 g. of the crude 2-amino-4-hydroxy pyrimidine. When 6.0 of this compound was treated as above it gave 2.3 g. of 2,4-diamino-5-(p-phenylsulformyl-phenoxy)-6-methylpyrimidine, whose hydrochloride melted at 274–276°.

EXAMPLE 49

*2,4-diamino - 5 - p-(p'chlorobenzyloxyphenoxy) - 6-methylpyrimidine*

From 46.2 g. of the mono-p-chlorobenzyl ester of hydroquinone and 32.4 g. of ethyl α-chloroacetoacetate with 4.5 g. of sodium in toluene was prepared crude ethyl α-ethyl-p-chlorobenzyloxyphenoxyacetate, which when treated with guanidine in the usual manner gave 26 g. of crude 2-amino-4-hydroxy pyrimidine. This compound (26 g.) on treatment with phorphorus oxychloride followed by alcoholic ammonia at 160° gave 13.5 g. of the required 2,4-diamino-5-p-(p-chlorobenzyloxy phenoxy)-6-methylpyrimidine melting at 179–183°.

EXAMPLE 50

*2,4-diamino-5-p-chlorophenoxy - 6 - ethyl pyrimidine*

From ethyl α-propionyl-p-chlorophenoxy acetate and guanidine was prepared 2-amino-4-hydroxy-5-p-chlorophenoxy - 6 - ethyl pyrimidine. From 6.0 g. of this compound there was prepared 2.6 g. of 2,4-diamino-5-p-chlorophenoxy-6-ethyl-pyrimidine (M. P. 170–174°) following the usual method given above.

EXAMPLE 51

*2,4-diamino - 5 - (2',4-dibromophenoxy)-pyrimidine*

From 79 g. of ethyl 2,4-dibromophenoxyacetate, 21 g. ethyl formate and 5.5 g. of sodium wire in ether was prepared ethyl α-formyl-2,4-dibromophenoxyacetate. This on condensation with guanidine in the usual manner gave 42 g. of crude aminohydroxy pyrimidine. Ten grams of this crude material on treatment with the usual reagents gave 7.5 g. of 2,4-diamino-5-(2',4'-dibromophenoxy) pyrimidine. M. P., 163–169°.

EXAMPLE 52

*2,4 - diamino-5-(p-hydroxyphenoxy) pyrimidine*

2.5 g. of 2,4-diamino-5-p-benzyloxyphenoxy pyrimidine in glacial acetic acid (100 ml.) on reduction with palladium on charcoal gave 1.3 g. of the desired compound melting at 227–230° after recrystallization from methanol.

EXAMPLE 53

*2,4-diamino-5-(2' isopropyl-4'-chloro-5'-methylphenoxy) pyrimidine*

From ethyl 2-isopropyl-4-chloro - 5 - methylphenoxyacetate (67 g.) ethylformate (19 g.) and sodium wire (5.8 g.) in ether was prepared ethyl α-formyl-2-isopropyl-4-chloro - 5 - methylphenoxy acetate. On condensation of the crude formyl compound with guanidine there was obtained 32 g. of crude amino-hydroxy pyrimidine. This compound (15 g.) gave 9.7 g. of 2,4-diamino-5-(2' isopropyl-4'-chloro-5'-methylphenoxy) pyrimidine melting at 205–208°.

EXAMPLE 54

*2,4-diamino-5-phenoxy pyrimidine*

From 15.3 g. of 2-acetamido-4-hydroxy-5-phenoxy pyrimidine by the usual treatment with phorphorus oxychloride followed by alcoholic ammonia at 160° was prepared 3.4 g. of 2,4-diamino-5-phenoxy pyrimidine melting at 162–165°.

EXAMPLE 55

*2,4-diamino-5-m-methoxyphenoxy pyrimidine*

From 50 g. of ethyl-m-methoxyphenoxyacetate, 25 g. of ethyl formate and 6.5 g. of sodium wire in dry ether was prepared ethyl-α-formyl-m-methoxyphenoxyacetate. This, when condensed with guanidine gave 18.5 g. of the crude amino-hydroxy compound. Ten grams of this compound with the usual treatment gave 5.4 g. of compound melting at 174–176°.

EXAMPLE 56

*2,4-diamino-5-(2',4',5'-trichlorophenoxy) pyrimidine*

From 56 g. of ethyl trichlorophenoxy acetate by the procedure described above was prepared 18.5 g. of the desired 2-amino-4-hydroxy pyrimidine. From 7.0 g. of this compound by the usual procedure was prepared 4.3 g. of 2,4-diamino-5-(2',4',5'-trichlorophenoxy) pyrimidine, M. P. 228–230°.

EXAMPLE 57

*2,4-diamino - 5-(2' - chloro-4'-tertbutylphenoxy) pyrimidine*

From 50 g. of ethyl 2-chloro-4-tert. butylphenoxyacetate and 16 g. of ethylformate by the procedure described in Example 55 was prepared 33 g. of crude amino-hydroxy compound. Ten grams of this crude compound gave, after chlorination and amination, 3.0 g. of 2,4-diamino-5-(2'-chloro - 4' - tert - butylphenoxy) pyrimidine whose sulfate did not melt at 320° C.

EXAMPLE 58

*2,4 - diamino - 5 - m - chlorophenoxy - 6 - methyl pyrimidine*

From ethyl α-acetyl-p-chlorophenoxyacetate and guanidine carbonate was prepared 2, amino-4-hydroxy-5-m-chlorophenoxy-6-methyl pyrimidine. This compound on treatment with phorphorus oxychloride followed by ammonia gave 2,4-diamino-5-m-chlorophenoxy - 6 - methyl pyrimidine, whose sulfate melted at 270–273°.

EXAMPLE 59

*2,4-diamino - 5(2',4' - dichloro - α - naphthoxy) pyrimidine*

To sodium wire (2.3 g.) under ether was added ethyl 2,4-dichloro-α-naphthoxyacetate (30 g.) and ethyl formate (10.9 g.). After standing for 20 hours guanidine (from 10 g. of the hydrochloride) in ethanol (150 ml.) was added and the solution refluxed overnight. The solution was then poured into water and the solution acidified with acetic acid. The precipitate was filtered off (17 g.). This crude amino hydroxy pyrimidine was refluxed with phosphorus oxychloride (50 ml.) until all was dissolved. The excess phosphoryl chloride was removed in vacuum and the residue poured onto cracked ice and ammonia, when all was solid it was filtered off and heated with saturated ethanolic ammonia (100 ml.) for 16 hours at 130°. The reaction mixture was cooled and the alcohol and excess ammonia evaporated on a steam bath. The residue crystallized from methanol as prisms. M. P. 244°.

Calcd. for $C_{14}H_{11}ON_4Cl_2$: C, 52.1; H, 3.4; N, 17.4. Found: C, 51.9; H, 3.3; N, 17.0.

EXAMPLE 60

*2,4-diamino-5-(6'-bromo - β - naphthoxy) pyrimidine*

Ethyl 6-bromo-β-naphthoxyacetate (55 g.) and ethyl formate (20 ml.) were added to sodium (4.1 g.) under ether. After standing overnight the sodium salt was reacted with guanidine (from HCl 16.5 g. and sodium (4.1 g.)) in ethanol (100 ml.). After refluxing for 24 hours the whole was poured into water, the solution acidified and the product collected (20 g.). The pyrimidine was refluxed with phosphorus oxychloride (100 ml.). When all in solution the excess phosphorus oxychloride was removed and the residue poured onto ice made alkaline with ammonia. The chloro compound was then filtered off and heated with 100 ml. of saturated ethanolic ammonia. The product after removal of the ammonia and alcohol was recrystallized from methanol, M. P. 186–187°.

Calcd. for $C_{14}H_{11}ON_4Br$: N, 16.9. Found: N, 16.7.

EXAMPLE 61

*2,4-diamino-5-(β-naphthoxy)-6 - n - propylpyrimidine*

α-(β-Naphthoxy) butyoxylacetic ester (20 g.) was refluxed with guanidine carbonate (10 g.) in ethanol (50 cc.) until the evolution of carbon dioxide ceased. The reaction mixture was poured into water and acidified, the solid was filtered and recrystallized from ethanol, M. P. 291–293°.

The above amino-hydroxy compound (10 g.) was heated with phosphorus oxychloride (50 ml.) in the usual manner. After all went into solution the excess phorphorus oxychloride was removed and the residue poured onto ice. The aqueous layer was made alkaline with ammonia and the chloro compound filtered off. It was heated with ethanolic ammonia (80 ml. sat. at 0°) for 15 hours. The residue after removal of the ethanol and ammonia was converted to the sulfate. This salt formed small needles on crystallization from ethanol ether.

EXAMPLE 62

*2,4-diamino-5-(p-tert butylphenoxy) pyrimidine*

2-amino - 4 - hydroxy-5-(p-tertbutylphenoxy) pyrimidine (6 g.) was prepared from ethyl p-tert-butylphenoxyacetate (45 g.) ethyl formate (25 g.) and sodium (7.3 g.) as in the previous example. It was a microcrystalline powder, M. P. 296–300°. This pyrimidine (23 g.) was refluxed with phosphoryl chloride (150 ml.) in the usual manner. After heating with ethanolic ammonia (200 ml.) for 16 hours at 150°, the compound was isolated by evaporation of the ethanol ammonia followed by solution of the material in dilute acetic acid followed by precipitation with sodium hydroxide. The material was recrystallized from aqueous methanol. Needles, M. P. 157–160° (12.2 g.).

Anal.: Calcd. for $C_{16}H_{18}ON_4$: N, 21.7. Found: N, 21.3.

EXAMPLE 63

*2,4-diamino-5-phenoxy-6-methylpyrimidine*

2-amino-4-hydroxy - 5 - phenoxy-6-methylpyrimidine (25 g.) prepared from ethyl-α-phenoxy acetoacetate and guanidine, was heated with phosphorus oxychloride (100 ml.), the chloro compound was heated overnight with a saturated ethanolic solution of ammonia (100 ml.). The diamino compound (12.5 g.) was recrystallized from ethanol prisms, M. P. 180°.

Anal.: Calcd. for $C_{11}H_{12}ON_4$: N, 26.0. Found: N, 26.2.

EXAMPLE 64

2,4-diamino-5-thymoxypyrimidine

The aminooxypyrimidine (30 g.) prepared from ethyl thymoxyacetate, ethyl formate and sodium in the usual manner, was chlorinated with phosphorus oxychloride (100 ml.). The product was worked up in the usual manner and the chloro compound heated with ethanolic ammonia (100 ml.). The excess ammonia and ethanol were removed and the product recrystallized from aqueous methanol, M. P. 163–165°.

Anal.: Calcd. for $C_{14}H_{18}ON_4$: N, 21.7. Found: N, 21.9.

EXAMPLE 65

2,4-diamino-5-α-naphthoxypyrimidine

Ethyl-α-naphthoxyacetate (20 g.) was reacted with ethyl formate (7.5 g.) and sodium (2 g.) in the usual manner. The formyl compound was then reacted with guanidine (from 8.7 g. of the hydrochloride and sodium ethoxide). The mixture was refluxed for 16 hours. The aminohydroxy compound was worked up in the usual manner to give (8.0 g.). This was chlorinated with 50 ml. of phosphorus oxychloride, the chloro compound was worked up in the usual manner and heated with saturated ethanolic ammonia. The product after recrystallization from methanol formed prisms, M. P. 195°.

Anal.: Calcd. for $C_{14}H_{12}ON_4$: C, 66.7; H, 4.8. Found: C, 67.0; H, 6.6.

EXAMPLE 66

2,4-diamino-5-p-methoxyphenoxy pyrimidine 2-amino-4-hydroxy-5-p-methoxy phenoxypyrimidine (23 g.) prepared from ethyl-p-methoxyphenoxy formylacetate and guanidine, was refluxed with phosphorus oxychloride (150 ml.) in the usual manner. The chloro compound was heated with ethanolic ammonia in the usual manner. After removal of the ethanol and ammonia the product was recrystallized from methanol. M. P. 149–150°.

Anal.: Calcd. for $C_{11}H_{12}N_4O_2 \cdot H_2O$: N, 22.4. Found: N, 21.9.

EXAMPLE 67

2,4-diamino-5-p-methoxyphenoxy-6-methyl-pyrimidine

The amino hydroxy compound (30 g.) was chlorinated with phosphorus oxychloride in the usual manner, the resulting chloro compound was heated with alcoholic ammonia (100 ml.) for 16 hours. After evaporation of the alcohol and ammonia the residue was recrystallized from ethanol water. It formed needles, 15 g., M. P. 211–213°.

Anal.: Calcd. for $C_{12}H_{14}O_2N_4$: N, 23.9. Found: N, 23.5.

We claim:

1. As a new compound a substituted pyrimidine of the formula

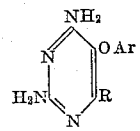

wherein R constitutes a radical selected from the group consisting of H and lower alkyl radicals and wherein Ar constitutes an aryl radical having from 6 to 13 carbon atoms and contains a maximum of two rings.

2. 2,4-diamino - 5 - (2' isopropyl-4'-chloro-5'-methylphenoxy) pyrimidine.

3. 2,4-diamino - 5 - (3' methyl-4'-chlorophenoxy) pyrimidine.

4. 2,4-diamino - 5-(2',4',5' - trichlorophenoxy) pyrimidine.

5. 2,4-diamino-5-m - methoxyphenoxy pyrimidine.

6. 2,4-diamino-5-m-chlorophenoxy - 6-methyl pyrimidine.

GEORGE H. HITCHINGS.
PETER BYROM RUSSELL.
ELVIRA A. FALCO.

No references cited.